United States Patent [19]
Ishikawa et al.

[11] Patent Number: 6,075,403
[45] Date of Patent: Jun. 13, 2000

[54] CHARGE PUMP CIRCUIT

[75] Inventors: Takeshi Ishikawa; Tomohisa Yamamoto; Hiroyuki Ban, all of Aichi-ken; Junichi Nagata; Junji Hayakawa, both of Okazaki, all of Japan

[73] Assignee: Denso Corporation, Japan

[21] Appl. No.: 09/017,495

[22] Filed: Feb. 2, 1998

[30] Foreign Application Priority Data

Feb. 3, 1997 [JP] Japan ................................. 9-020717
Nov. 7, 1997 [JP] Japan ................................. 9-305849

[51] Int. Cl.[7] ................................................ G05F 1/10
[52] U.S. Cl. .......................... 327/536; 327/540; 363/60
[58] Field of Search ................................. 327/74, 88, 536, 327/540, 538, 548; 363/59, 60

[56] References Cited

U.S. PATENT DOCUMENTS

| | | |
|---|---|---|
| 5,036,229 | 7/1991 | Tran . |
| 5,059,815 | 10/1991 | Bill et al. ............................. 307/246 |
| 5,191,232 | 3/1993 | Wang ..................................... 307/264 |
| 5,426,334 | 6/1995 | Skovmand .............................. 327/536 |
| 5,604,671 | 2/1997 | Okamura ............................... 363/60 |
| 5,694,072 | 12/1997 | Hsiao et al. ........................... 327/537 |
| 5,796,293 | 8/1998 | Yoon et al. ............................. 327/540 |

FOREIGN PATENT DOCUMENTS

| | | |
|---|---|---|
| 0319063 A2 | 6/1989 | European Pat. Off. . |
| 0 445 083 | 9/1991 | European Pat. Off. . |
| 691-729 | 1/1996 | European Pat. Off. . |
| 0 731 554 | 9/1996 | European Pat. Off. . |
| 0 732 682 | 9/1996 | European Pat. Off. . |
| 0756220 A1 | 1/1997 | European Pat. Off. . |
| 41 07 597 | 9/1992 | Germany . |
| 5-268761 | 10/1993 | Japan . |
| 7-288973 | 10/1995 | Japan . |
| 8-088967 | 4/1996 | Japan . |

OTHER PUBLICATIONS

Patent Abstract of Japan, vol. 15, No. 29, Jan. 23, 1991.
Patent Abstract of Japan, vol. 17, No. 542, Sep. 29, 1993.
Patent Abstract of Japan, vol. 5, No. 11, Jan. 23, 1981.

*Primary Examiner*—Jung Ho Kim
*Attorney, Agent, or Firm*—Pillsbury Madison & Sutro LLP

[57] ABSTRACT

A charge pump circuit comprises a plurality of capacitors arranged to charge and discharge for generating a charged-up voltage. An oscillation circuit generates a clock signal to be applied to the plurality of capacitors to alternately charge and discharge these charge-up capacitors. A monitoring circuit detects electrical potentials on at least two of the charge-up capacitors and controls the clock signal. An oscillating condition of the oscillation circuit based on the electrical potentials on the at least two of the charge-up capacitors.

16 Claims, 17 Drawing Sheets

CHARGE PUMP CIRCUIT

BACKGROUND OF THE INVENTION

The present invention relates to a charge pump circuit which charges up a voltage supplied from an external device (e.g., a power source) and produces a charged-up voltage.

FIG. 19 shows an arrangement of a conventional charge pump circuit.

A power source 1 is connected via a diode 2 to a positive terminal of a first capacitor 3. A connecting point between the diode 2 and the positive terminal of the capacitor 3 is connected via a diode 4 to a positive terminal of a second capacitor 5. A negative terminal of the capacitor 3 is connected to an output terminal of an oscillator 7 via an inverter 8. A negative terminal of the capacitor 5 is connected to the output terminal of the oscillator 7 via serial inverters 9 and 10. The oscillator 7 produces an oscillation signal (i.e., clock signal) having a constant frequency. An output terminal 6, connected to a connecting point between the diode 4 and the positive terminal of the capacitor 5, produces a charged-up voltage. The inverters 8 to 10 have CMOS circuit arrangements.

According to the above-described conventional circuit arrangement, when the oscillator 7 produces a high-level output signal, the inverter 8 generates a low-level output signal. Therefore, the capacitor 3 is charged up to a power source voltage level through its positive terminal connected via the diode 2 to the power source 1.

When the oscillator 7 produces a low-level output signal, the inverter 8 generates a high-level output signal. Therefore, the negative terminal of the capacitor 3 has an electrical potential equal to the power source voltage. The positive terminal of the capacitor 3 is charged up to a predetermined voltage which is equivalent to two times the power source voltage minus a voltage drop $V_F$ at the diode 2.

Furthermore, when the oscillator 7 produces a low-level output signal, the inverter 10 generates a low-level output signal. The positive terminal of the capacitor 5 may have an electric potential lower than a predetermined value which is equivalent to the electric potential of the positive terminal of the capacitor 3 minus the voltage drop $V_F$ at the diode 4. In this case, electric charges can flow from the positive terminal of the capacitor 3 to the positive terminal of the capacitor 5 by the rectifying function of the diode 4. Thus, the positive terminal of the capacitor 5 is charged up to a predetermined voltage which is equivalent to two times the power source voltage minus a voltage drop $2 \times V_F$ at the diodes 2 and 4.

Next, when the oscillator 7 produces a high-level output signal, the inverter 10 generates a high-level output signal. The negative terminal of the capacitor 5 has an electrical potential equal to the power source voltage. The positive terminal of the capacitor 5 is charged up to a predetermined voltage which is equivalent to three times the power source voltage minus the voltage drop $2 \times V_F$ at the diodes 2 and 4. The charged-up voltage is supplied via the output terminal 6 to an electric load connected to this output terminal 6.

However, the above-described conventional circuit arrangement is disadvantageous in that a stable and desirable charged-up voltage is not obtained because the oscillator 7 is provided as an external component. For example, when the oscillator 7 has a higher oscillation frequency, the capacitors 3 and 5 cannot follow the charging and discharging operations. The charged-up voltage cannot reach a desired voltage value. Even when the oscillator 7 has a constant oscillation frequency, dispersions in the capacity and charge/discharge currents of capacitors 3 and 5 as well as their temperature dependencies possibly vary the electrical potentials of the positive terminals of capacitors 3 and 5. Thus, the charged-up voltage will be varied undesirably.

SUMMARY OF THE INVENTION

In view of the foregoing problems encountered in the prior art, the present invention has an object of obtaining a stable and desirable charged-up voltage.

In order to accomplish the above-described and other related objects, the present invention provides a charge pump circuit comprising a plurality of capacitors (3, 5; 12a~12e) arrange to charge and discharge for generating a charged-up voltage, oscillating means (130; 100) for generating a clock signal to be applied to the plurality of capacitors to alternately charge and discharge these charge-up capacitors, and monitoring means (110, 120; 13~15) for detecting electrical potentials on at least two of the capacitors and controlling the dock in of the oscillating means based on the electrical potentials on the at least two of the capacitors.

More specifically, one aspect of the present invention provides a first comparing means (110) for comparing a voltage of the other terminal of the first capacitor (3) with a first reference voltage, a second comparing means (120) for comparing a voltage of the other terminal of the second capacitor (5) with a second reference voltage, and charge/discharge control means (8–10, 130, 180, 190, 200, 210, 24–27) for alternately charging and discharging the first and second capacitors (3, 5) via the other terminals of the first and second capacitors (3, 5) based on comparison results from the first comparing means (110) and the second comparing means (120).

These features realize a self-oscillation type charge pump circuit which monitors the voltages of the other terminals of the first and second capacitors (3, 5) and alternately charges and discharges the first and second capacitors (3, 5) via the other terminals of the first and second capacitors (3, 5). Therefore, it becomes possible to set an oscillation frequency suitable for obtaining a desirable charged-up voltage. Furthermore, monitoring the voltages of the other terminals of the first and second capacitors (3, 5) makes it possible to obtain a stable charged-up voltage without being influenced by the dispersions in the capacity and charge/discharge currents of capacitors as well as their temperature dependencies.

Preferably, the charge/discharge control means comprises flip-flop circuit means (130), first switching means (8, 190) responsive to an output of this flip-flop circuit means (130) for performing the charge and discharge of the first capacitor (3) via the other terminal of the first capacitor (3), and second switching means (9, 10, 210) responsive to the output of the flip-flop circuit means (130) for performing the charge and discharge of the second capacitor (5) via the other terminal of the second capacitor (5).

Preferably, the charge/discharge control means comprises constant current charging means (180, 200) connected to the other terminals of the first and second capacitors (3, 5) for supplying constant current to charge these first and second capacitors (3, 5). With this arrangement, the charging voltage waveform of the other terminals of the first and second capacitors (3, 5) can be shaped into a trapezoidal shape. Thus, radio noises derived from the charging voltage waveforms can be eliminated.

Preferably, the constant-current charging means (180, 200) comprises a current-mirror circuit (300~302) which is connected to a power source (1) and supplies the constant current.

In this case, it is preferable to provide a means (22, 23) for forming a path which allows the constant current to flow from the current mirror circuit (300~302) without flowing to the capacitors after the constant-current charge operation is performed. With this arrangement, it becomes possible to eliminate any current control disabled condition after the constant-current charge operation is finished. It becomes possible to prevent the radio noises from being produced due to current fluctuations occurring in the power source.

Preferably, resistance means (24, 25) are connected in series with the other terminal of the first and second capacitors (3, 5) for shaping a discharge voltage waveform into a trapezoidal shape. With this arrangement, the radio noises derived from the discharging voltage waveform can be eliminated. Furthermore, it is preferable that constant-current discharging means (26, 27) are connected to the other terminals of the first and second capacitors (3, 5) for discharging constant current from the first and second capacitors (3, 5).

Moreover, a second aspect of the present invention provides self oscillating means (8~10, 130, 180, 190, 200, 210, 24~27) for monitoring a voltage of the other terminal of the first capacitor (3) and a voltage of the other terminal of the second capacitor (5) and for performing a self oscillation so as to alternately execute the charging and discharging of the other terminals of the first and second capacitors (3, 5). With this arrangement, it becomes possible to obtain the same effects as those of the first aspect of the present invention.

In this case, it is preferable to provide a means (160) for stopping the self oscillation. This makes it possible to forcibly stop the charge pump operation at any time.

Furthermore, a third aspect of the present invention provides a charge pump circuit comprising first and second capacitors (12a, 12b), and first and second rectifying means (11a, 11b), wherein charging of the first capacitor (12a) via the one terminal of the first capacitor and charging of the second capacitor (12b) via the one terminal of the second capacitor are alternately performed to generate a charged-up voltage from the one terminal of the second capacitor (12b). The charge pump circuit further comprises a ring oscillation circuit (100) which includes a plurality of signal inversion circuits (13~15) connected in series and arranged in a ring shape to cause an oscillation, wherein output signals of different signal inversion circuits (13~15) are supplied to other terminals of the first capacitor (12a) and the second capacitor (12b), respectively.

In this case, as the output signals of different signal inversion circuits of the plurality of signal inversion circuits (13~15) are connected to the other terminals of the first capacitor (12a) and the second capacitor (12b), the ring oscillation circuit (100) performs its oscillating operation in accordance with the charge and discharge of the first and second capacitors (12a, 12b). Accordingly, a stable and desirable charged-up voltage is obtained.

In this case, it is preferable that the ring oscillation circuit (100) performs its oscillating operation with a signal transmission from the first signal inversion circuit (13) to the second signal inversion circuit (14). An output signal of the first signal inversion circuit (13) is supplied to other terminal of the first capacitor (12a), while an output signal of the second signal inversion circuit (14) is supplied to other terminal of the second capacitor (12b).

Alternatively, it is preferable that the ring oscillation circuit (100) performs its oscillating operation with a signal transmission from the first signal inversion circuit (14) to the second signal inversion circuit (15). An output signal of the second signal inversion circuit (15) is supplied to other terminal of the first capacitor (12a), while an output signal of the first signal inversion circuit (14) is supplied to other terminal of the second capacitor (12b).

In this arrangement, the output signal of the second signal inversion circuit (15) is an inversion signal of the output signal of the first signal inversion circuit (14). This makes it possible to prevent electric charges from being extracted from the second capacitor (12b) to the first capacitor (12a) by the effect of the parasitic capacitor of the second rectifying means (11b) when the second signal inversion circuit (15) produces a low-level output signal. The efficiency of the charge pump circuit can be improved.

Preferably, each of the signal inversion circuits (13, 14, 15) constituting the ring oscillation circuit (100) comprises an inverter (131, 141, 151) and a buffer (132, 142, 152). In this case, the inverter (131, 141, 151) may comprise an NPN transistor (131b, 141b, 151b). A resistor (131d, 141d, 151d) is interposed between emitter and base terminals of the NPN transistor (131b, 141b, 151b). This arrangement makes it possible to extract the electric charges from the base terminal of the NPN transistor (131b, 141b, 151b) when the NPN transistor (131b, 141b, 151b)is changed from ON to OFF. The switching speed of the NPN transistor (131b, 141b, 151b) can be increased. A high-speed operation is feasible.

Furthermore, it is preferable that the buffer (132, 142, 152) comprises an NPN transistor (132a, 142a, 152a) and a PNP transistor (132b, 142b, 152b) which cooperatively produce an emitter-follower output signal. This arrangement is advantageous in that the delay at the buffer (132, 142, 152) can be minimized. In this case, the high-speed operation is feasible, too.

The reference numerals in parentheses, added in the foregoing description, show the correspondence to the components disclosed in later-described preferred embodiments of the present invention. Therefore these numerals are merely used for expediting the understanding to the present invention and not used for narrowly interpreting the scope of the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
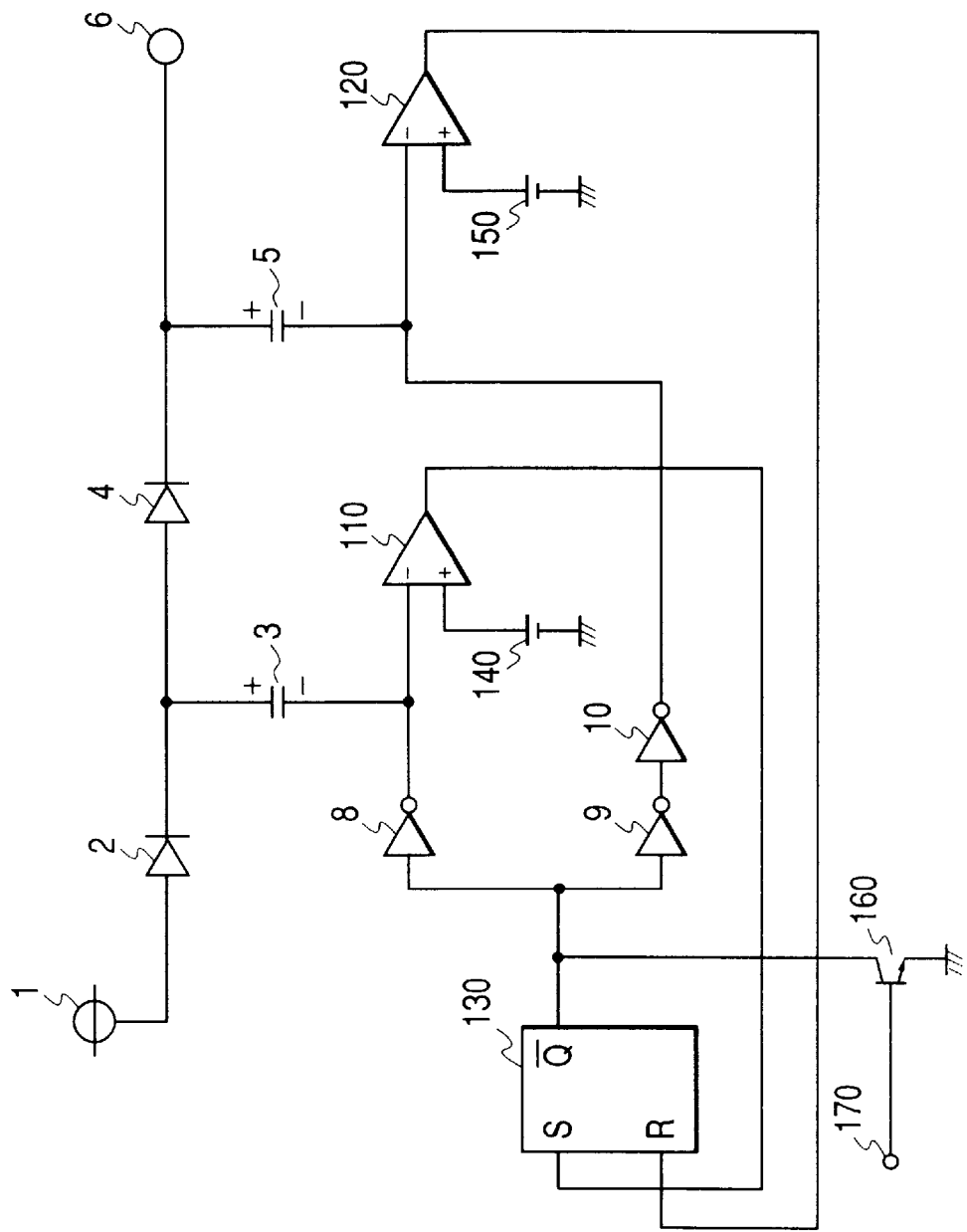
FIG. 1 is a circuit diagram showing an arrangement of a charge pump circuit in accordance with a first embodiment of the present invention.

Preferred embodiments of the present invention will be explained hereinafter with reference to accompanied drawings. Identical parts are denoted by the same reference numerals throughout the drawings.

First Embodiment

FIG. 1 shows a circuit arrangement of a charge pump circuit in accordance with a first embodiment of the present invention.

Figure 19:
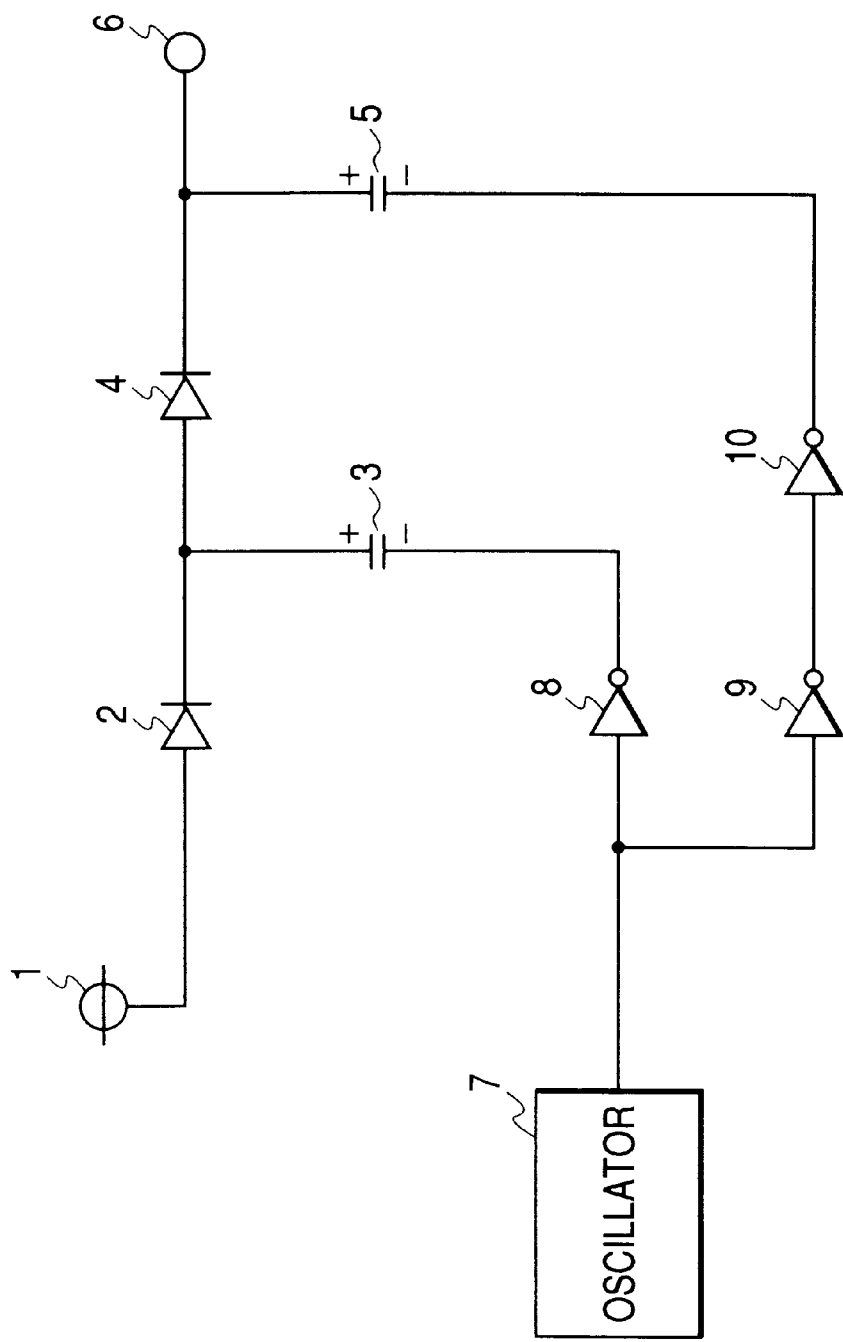
FIG. 19 is a circuit diagram showing an arrangement of a conventional charge pump circuit.

The first embodiment is different from the above-described conventional charge pump circuit shown in FIG. 19 in that comparators 110 and 120 and a flip-flop circuit 130 are provided to monitor the voltages of negative terminals of the capacitors 3 and 5, thereby realizing a self oscillation arrangement causing a self oscillation.

An operation of the charge pump circuit shown in FIG. 1 will be explained, hereinafter.

It is assumed that the flip-flop circuit 130 is reset and a high-level signal is output from its Q bar terminal. In this condition, the inverter 8 outputs a low-level signal. Thus, the electrical potential of the negative terminal of the capacitor 3 is lowered. The capacitor 3, through its positive terminal connected via the diode 2 to the power source 1, is charged by electric power. Meanwhile, the inverter 10 outputs a high-level signal. Thus, the electrical potential of the negative terminal of the capacitor 5 is increased to the power voltage level. When the electrical potential of the negative terminal of the capacitor 3 is lower than a predetermined reference voltage (i.e., first reference voltage) of a reference power source 140, the comparator 110 outputs a high-level signal which is supplied to an S terminal of the flip-flop circuit 130, thereby setting the flip-flop circuit 130.

When the flip-flop circuit 130 is set, its Q bar terminal produces a low-level signal. In this condition, the inverter 8 outputs a high-level signal. The electrical potential of the positive terminal of the capacitor 3 is increased. Furthermore, the inverter 10 outputs a low-level signal. Thus, the electrical potential of the positive terminal of the capacitor 5 is lowered. The electrical potential of the positive terminal of the capacitor 5 may become lower than a predetermined value which is equivalent to the electrical potential of the positive terminal of the capacitor 3 minus voltage drop $V_F$ at the diode 4. In such a case, electric charges can flow from the positive terminal of the capacitor 3 to the positive terminal of the capacitor 5 by the rectify function of the diode 4. Thus, the capacitor 5 is charged via its positive terminal.

When the electrical potential of the negative terminal of the capacitor 5 is lower than a predetermined reference voltage (i.e., second reference voltage) of a reference power source 150, the comparator 120 outputs a high-level signal which is supplied to a R terminal of the flip-flop circuit 130, thereby resetting the flip-flop circuit 130. Thus, the flip-flop circuit 130 generates a high-level signal from its Q bar terminal.

Accordingly, a self oscillation is performed by repeating the above-described operation. The electrical potential of the positive terminal of the capacitor 5 is charged up to a predetermined voltage which is equivalent to three times the power source voltage minus a voltage drop $2 \times V_F$ at the diodes 2 and 4, in the same manner as the circuit shown in FIG. 19.

When a high-level signal is supplied from a terminal 170 to an NPN transistor 160, the above-described self oscillation is stopped. Namely, the NPN transistor 160 is turned on in response to the high-level signal supplied from the terminal 170. This forces the flip-flop circuit 130 to produce a low-level signal from its Q bar terminal.

According to an oscillation loop of the above-described self oscillation, a significant delay time is caused in an operation of the element. This is effective in that charging to the negative terminals of the capacitors 3 and 5 can be performed sufficiently.

As described above, the first embodiment monitors the electrical potentials of the capacitors 3 and 5 and causes a self oscillation. Therefore, it becomes possible to set an oscillation frequency suitable for obtaining a desirable charged-up voltage. Furthermore, monitoring the voltages of the capacitors 3 and 5 makes it possible to obtain a stable charged-up voltage without being influenced by the dispersions in the capacity and charge/discharge currents of capacitors 3 and 5 as well as their temperature dependencies.

Figure 2:
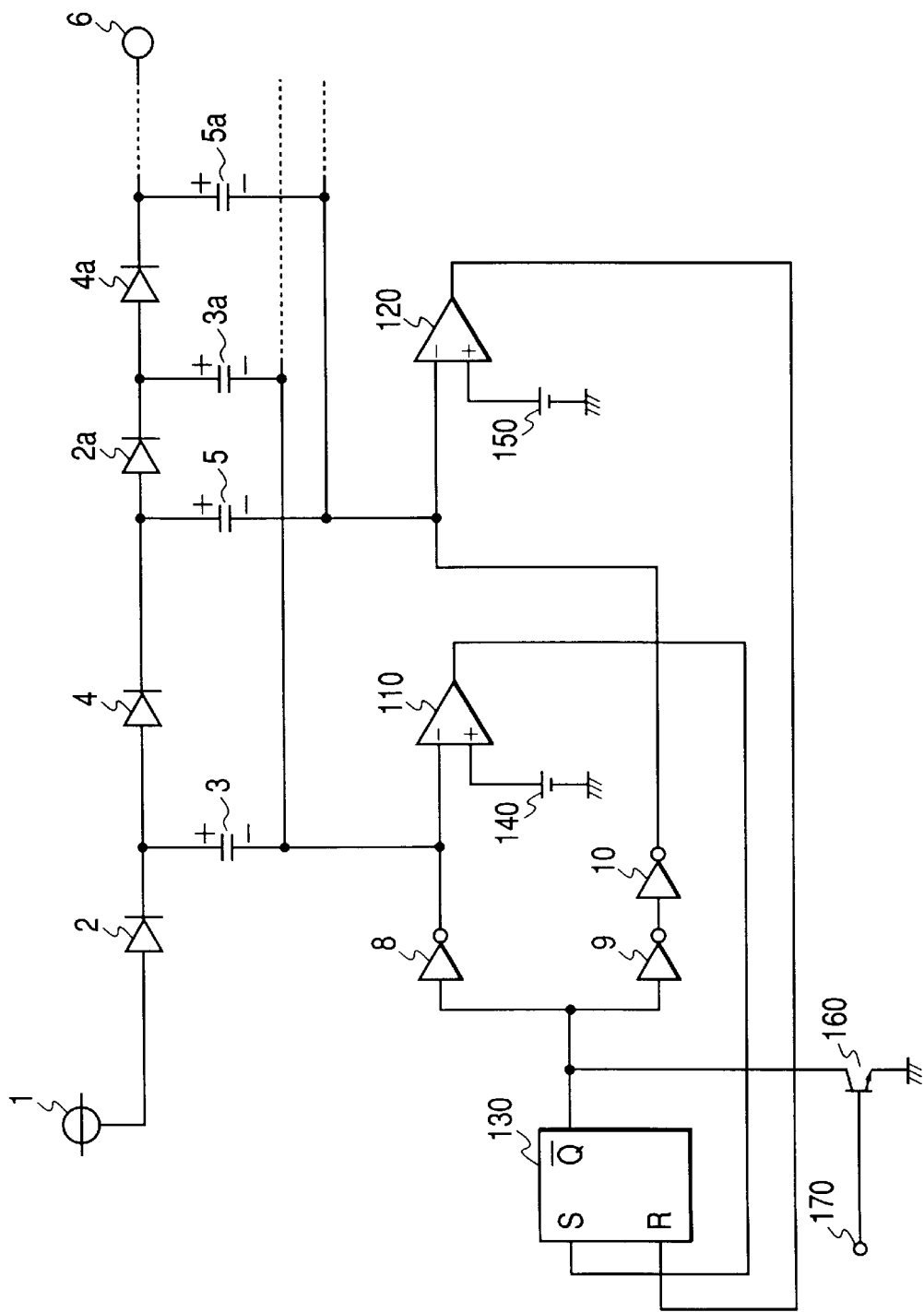
FIG. 2 is a circuit diagram showing a modification of the charge pump circuit shown in FIG. 1.

When a higher charged-up voltage is required compared with the above-described charged-up voltage, it is preferable to employ a multistage arrangement additionally connecting a required number of diodes 2a, 4a,—and capacitors 3a, 5a,—as shown in FIG. 2.

Second Embodiment

Figure 3:
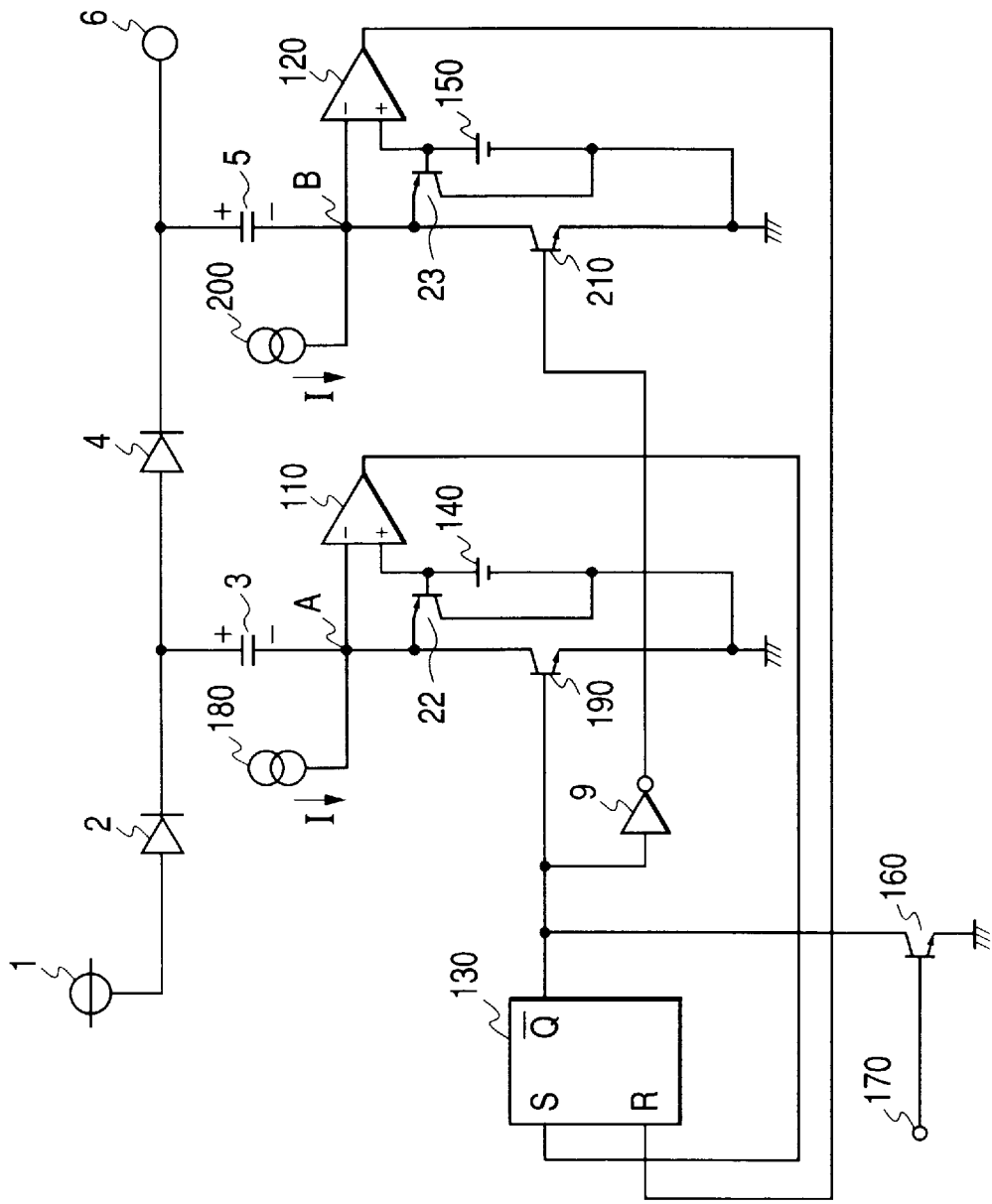
FIG. 3 is a circuit diagram showing an arrangement of a charge pump circuit in accordance with a second embodiment of the present invention.

FIG. 3 shows an arrangement of a charge pump circuit in accordance with a second embodiment of the present invention. The second embodiment is different from the first embodiment of FIG. 1 in that the inverter 8 is replaced by a constant-current circuit 180 and an NPN transistor 190 and the inverter 110 is replaced by a constant-current circuit 200 and an NPN transistor 210.

According to the arrangement of the second embodiment, when the flip-flop circuit 130 produces a high-level signal from its Q bar terminal, the NPN transistor 190 is turned on. The electrical potential of the negative terminal of the capacitor 3 is lowered due to the discharge. The positive terminal of the capacitor 3 is connected via the diode 2 to the power source 1. Thus, the capacitor 3 is charged by the power source 1. On the other hand, the inverter 9 outputs a low-level signal. The NPN transistor 210 is turned off in response to this low-level signal. The capacitor 5 is charged by the constant-current circuit 200 which supplies constant current to the negative terminal of the capacitor 5.

When the electrical potential of the negative terminal of the capacitor 3 is lower than the reference voltage of the reference power source 140, the comparator 110 outputs a high-level signal which is supplied to the S terminal of the flip-flop circuit 130, thereby setting the flip-flop circuit 130.

When the flip-flop circuit 130 is set, its Q bar terminal produces a low-level signal. The transistor 190 is turned off. In this condition, the capacitor 3 is charged by the constant-current circuit 180 which supplies constant current to the negative terminal of the capacitor 3. Meanwhile, the inverter 9 outputs a high-level signal. The transistor 210 is turned on. Electric charges of the capacitor 5 is discharged from its negative terminal. In this case, the electric potential of the positive terminal of the capacitor 5 is lowered. Thus, electric charges can flow from the positive terminal of the capacitor 3 to the positive terminal of the capacitor 5 by the rectifying function of the diode 4. Thus, the capacitor 5 is charged via its positive terminal.

Subsequently, the electrical potential of the negative terminal of the capacitor 5 may become smaller than the reference voltage of the reference power source 150. In such a case, the comparator 120 outputs a high-level signal which is supplied to the R terminal of the flip-flop circuit 130, thereby resetting the flip-flop circuit 130. Thus, the flip-flop circuit 130 generates a high-level signal from its Q bar terminal.

Accordingly, the second embodiment monitors the electrical potentials of the negative terminals of the capacitors 3 and 5 and performs a self oscillation, by repeating the above-described operation in the same manner as the first embodiment. The electrical potential of the positive terminal of the capacitor 5 is charged up to a predetermined voltage which is equivalent to three times the power source voltage minus a voltage drop $2 \times V_F$ at the diodes 2 and 4.

Figure 4:
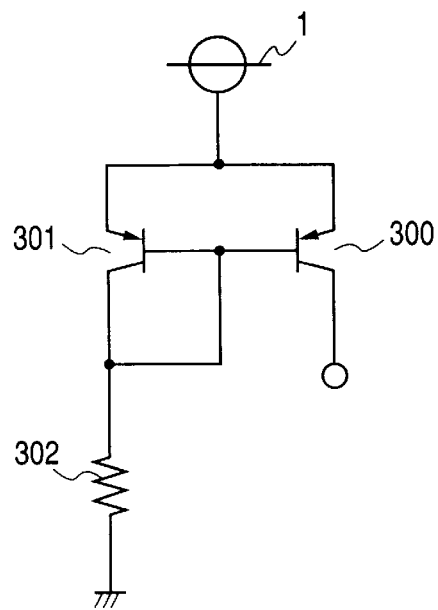
FIG. 4 is a circuit diagram showing a detailed circuit arrangement of a constant-current circuit shown in FIG. 3.

FIG. 4 shows a detailed arrangement of the above-described constant-current circuits 180 and 200. Each of the constant-current circuits 180 and 200 is constituted by a current-mirror circuit comprising a pair of PNP transistors 300 and 301 and a resistor 302.

When the constant-current circuit 180 (or 200) shown in FIG. 4 supplies constant current to the negative terminal of the capacitor 3 (or 5) to charge the capacitor 3 (or 5). After the charging is completed, the negative terminal of the capacitor 3 (or 5) holds the charged voltage. In this condition, the constant-current circuit 180 (or 200) cannot supply the constant current until the NPN transistor 190 (or 210) is turned on again. Accordingly, the PNP transistor 300 cannot supply current to its collector terminal. Thus, the current flows reversely toward the base terminal. By the current flowing reversely to the base, the currents flowing the constant-current circuit 180 (or 200) and the power source line 1 are varied. The variation of the current flowing into the power source line 1 possible causes radio noises.

To eliminate the above-described current-control disabled condition, as shown in FIG. 3, this embodiment provides PNP transistors 22 and 23 which are connected to the negative terminals of the capacitors 3 and 5, respectively.

With the above-described arrangement, the capacitor 3 (or 5) is charged by the constant-current circuit 180 (or 200) through its negative terminal. The charged voltage may exceed a predetermined value which is equivalent to the reference voltage of the reference power source 140 plus a base-emitter voltage. In such a case, the PNP transistor 22 (or 23) is turned on to form a path through which the constant current flows from the constant-current circuit 180 (or 200). Thus, the above-described current-control disabled condition can be eliminated. The radio noises can be suppressed.

Figure 5A:
FIGS. 5A and 5B are time charts showing oscillation waveforms appearing at the points A and B of FIG. 3.
Figure 5B:

FIGS. 5A and 5B show oscillation waveforms corresponding to the voltages at the negative terminals of capacitors 3 and 5, i.e., voltages at the points A and B in FIGS. 3. As shown in the drawing, after either voltage reaches the maximum value, the other voltage starts increasing. In other words, charge and discharge operations of the capacitors 3 and 5 can be performed effectively.

Third Embodiment

In the above-described second embodiment, the constant-current charging for the capacitors 3 and 5 is performed by the constant-current circuits 180 and 200 through the negative terminals of the capacitors 3 and 5. Accordingly, the waveform of the rising voltage appearing at the negative terminals of the capacitors 3 and 5 becomes a trapezoidal shape as shown in FIGS. 5A and 5B. However, the discharging operation is performed very quickly due to turning-on of the NPN transistors 190 and 200. Thus, as shown in FIGS. 5A and 5B, the falling portions of respective waveforms becomes steep. Such steep falling waveforms possibly cause radio noises.

Figure 6:
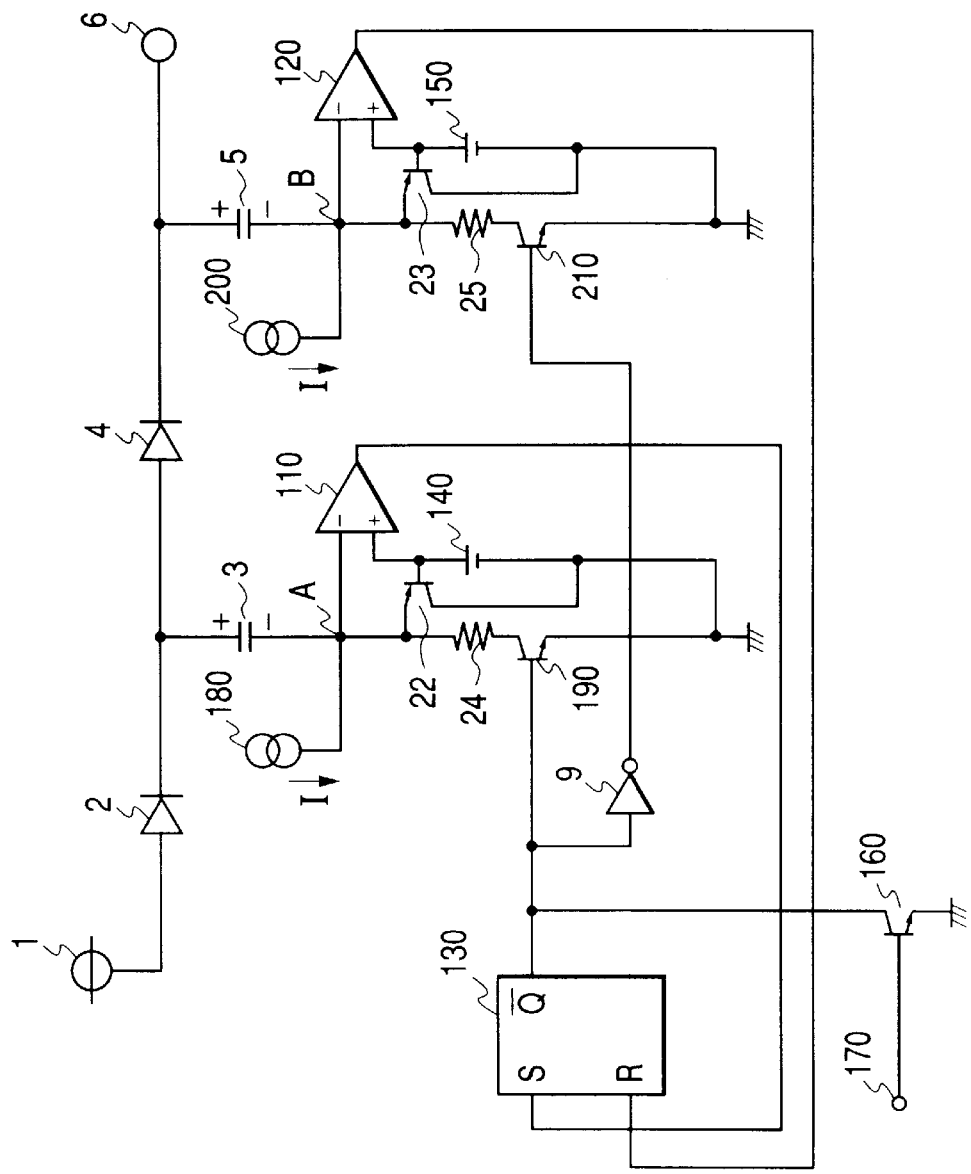
FIG. 6 is a circuit diagram showing an arrangement of a charge pump circuit in accordance with a third embodiment of the present invention.

Hence, to shape the falling waveform at the negative terminals of the capacitors 3 and 5 into a trapezoidal shape, the third embodiment provides resisters 24 and 25 interposed between the negative terminals of the capacitors 3 and 5 and NPN transistors 190 and 210, as shown in FIG. 6.

Figure 7A:
FIGS. 7A and 7B are time charts showing oscillation waveforms appearing at the points A and B of FIG. 3.
Figure 7B:

With this arrangement, the voltage level of each negative terminal of the capacitors 3 and 5 decreases at a time constant determined by the combination of capacitor 3 and resistor 24 or the combination of capacitor 5 and resistor 25. Thus, the falling waveform can be shaped into a trapezoidal wave. FIGS. 7A and 7B show waveforms of the voltages obtained at the points A and B according to this embodiment. As shown in the drawing, both the rising and falling portions of the waveforms can be shaped into a trapezoidal wave.

Fourth Embodiment

Figure 8:
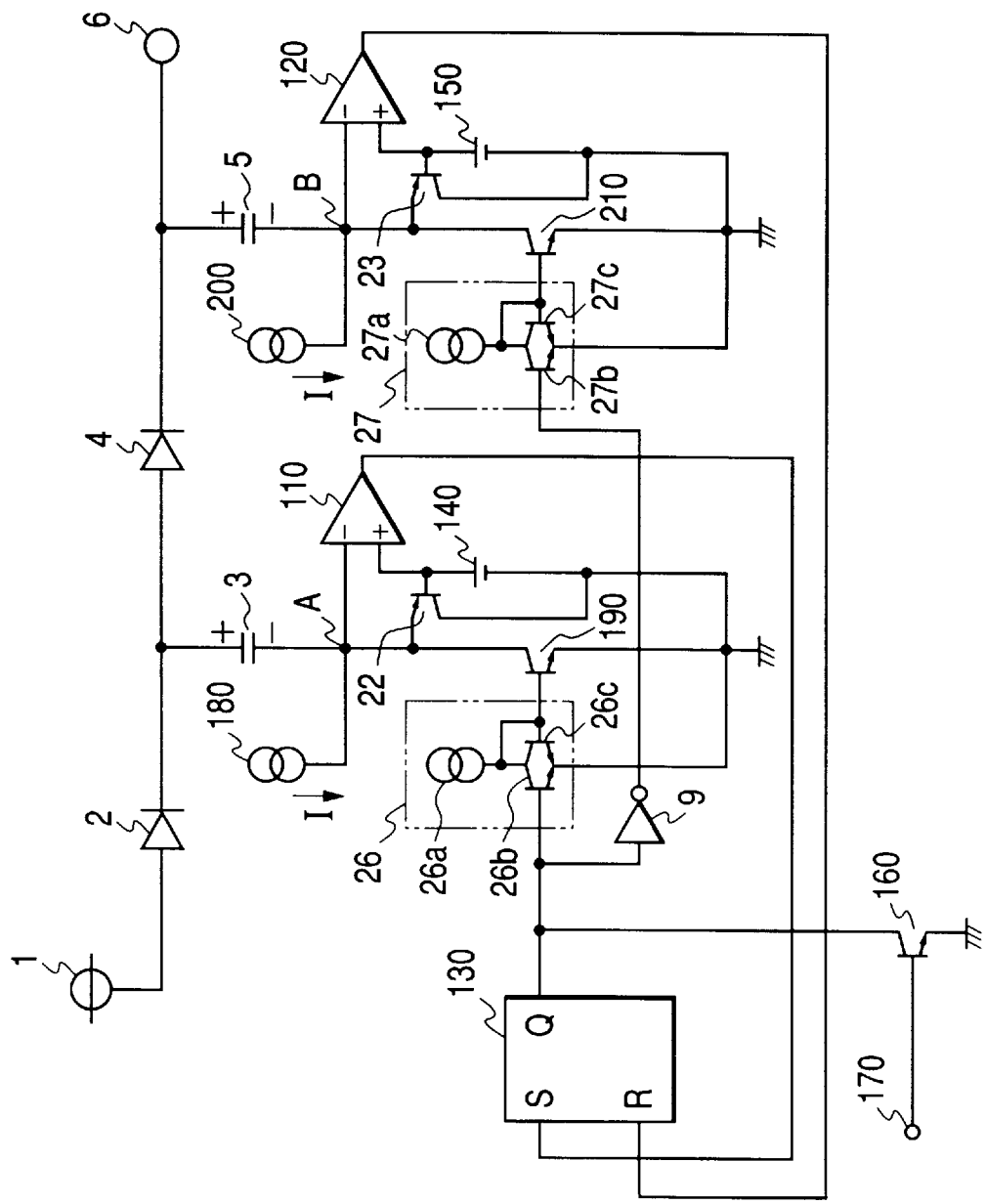
FIG. 8 is a circuit diagram showing an arrangement of a charge pump circuit in accordance with a fourth embodiment of the present invention.

The above-described third embodiment employs the resistors 24 and 25 to realize a trapezoidal waveform shaping for the rising voltage appearing at each negative terminal of the capacitors 3 and 5. FIG. 8 shows another arrangement for shaping the rising voltage waveform into a trapezoidal wave.

The circuit arrangement shown in FIG. 8 is characteristic in that constant-current discharge circuits 26 and 27 are interposed between the Q bar terminal of the flip-flop circuit 130 and the NPN transistors 190 and 210, respectively.

The constant-current discharge circuit 26 comprises a constant-current circuit 26a and two NPN transistors 26b and 26c. The constant-current discharge circuit 27 comprises a constant-current circuit 27a and two NPN transistors 27b and 27c.

As these two constant-current discharge circuits 26 and 27 are identical each other in their construction, the constant-current discharge circuit 26 will be explained regarding its operation. According to this embodiment, due to provision of the constant-current discharge circuits 26 and 27, both the NPN transistors 190 and 210 will operate reversely compared with those of the second embodiment. Thus, the self oscillation is performed by using an output signal of a Q terminal of the flip-flop circuit 130.

When the flip-flop circuit 130 produces a high-level signal from its Q terminal, the NPN transistor 26b is turned on. Thus, the NPN transistor 26c is turned off and the NPN transistor 190 is turned off. Accordingly, the capacitor 3 is charged through its negative terminal by the constant-current circuit 180 which supplies the constant current. Subsequently, when the flip-flop circuit 130 produces a low-level signal from its Q terminal, the NPN transistor 26b is turned off. Thus, both of the NPN transistors 26c and 190 are turned on. The NPN transistors 26c and 190 cooperatively constitute a current-mirror circuit. Accordingly, the capacitor 3 discharges from its negative terminal with discharge current having the same value as the constant current flowing from the constant-current circuit 26a. With this constant-current discharge operation, the waveform of the rising voltage appearing at the negative terminal of the capacitor 3 can be shaped into a trapezoidal wave.

Various Modifications

In the second through fourth embodiments, when a higher charged-up voltage is required compared with the above-described charged-up voltage, it is preferable to employ a multistage arrangement as shown in FIG. 2.

Furthermore, the trigger for setting and resetting the flip-flop circuit 130 is not limited to the falling voltage during the discharge from each negative terminal of the capacitors 3 and 5. The rising voltage during the charging through each negative terminal of the capacitors 3 and 5 can be utilized to set and reset the flip-flop circuit 130. For example, the circuit can be arranged so as to set or reset the flip-flop circuit 130 when the rising voltage exceeds a predetermined reference voltage during the charging operation through each negative terminal of the capacitors 3 and 5. Furthermore, the set and reset of the flip-flop circuit 130 may be performed reversely compared with the above-described embodiments, depending on the used signal output from the Q bar terminal or the Q terminal.

Moreover, the above-described embodiments employ the diodes 2 and 4 for rectifying currents. These diodes 2 and 4 can be replaced by any other comparable means, such as bipolar transistors and MOS transistors.

Fifth Embodiment

Figure 9:
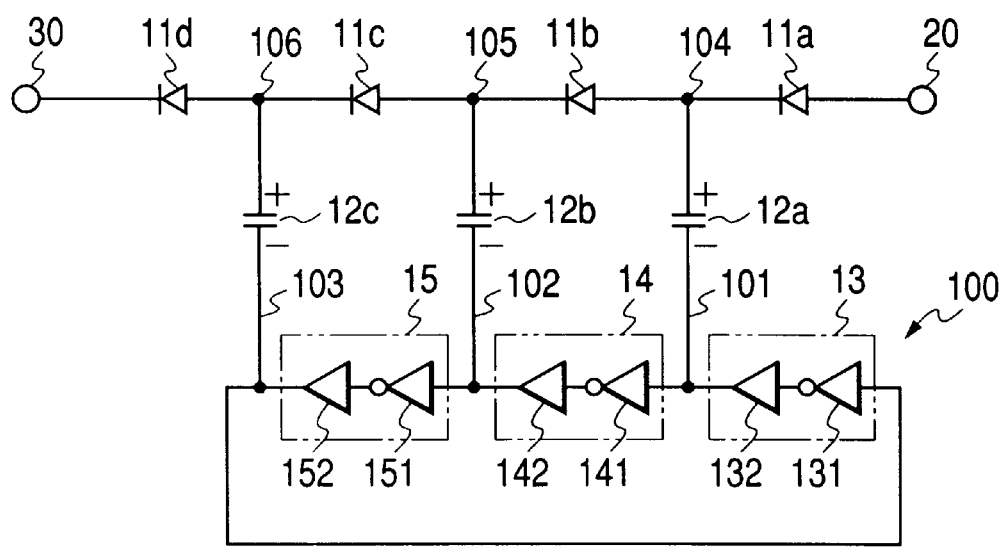
FIG. 9 is a circuit diagram showing an arrangement of a charge pump circuit in accordance with a fifth embodiment of the present invention.

FIG. 9 shows a circuit arrangement of a charge pump circuit in accordance with a fifth embodiment of the present invention.

According to this arrangement, serial diodes 11a to 11d are connected between an input terminal (i.e., power source terminal) 20 and an output terminal (i.e., charged-up terminal) 30. A connecting point between a first diode 11a and a second diode 11b is connected to a positive terminal of a first capacitor 12a. A connecting point between the second diode 11b and a third diode 11c is connected to a positive terminal of a second capacitor 12b. A connecting point between the third diode 11c and a fourth diode 11d is connected to a positive terminal of a third capacitor 12c.

Furthermore, an output terminal of a signal inversion circuit 13 is connected to a negative terminal of the first capacitor 12a. An output terminal of a signal inversion circuit 14 is connected to a negative terminal of the second capacitor 12b. An output terminal of a signal inversion circuit 15 is connected to a negative terminal of the third capacitor 12c. The signal inversion circuits 13, 14 and 15 are connected in series and arranged in a ring shape to constitute a ring oscillator 100.

The signal inversion circuit 13 comprises an inverter 131 and a buffer 132. Similarly, the signal inversion circuit 14 comprises an inverter 141 and a buffer 142. The signal inversion circuit 15 comprises an inverter 151 and a buffer 152.

An operation of the above-described circuit arrangement will be explained, hereinafter.

Figure 10A:
FIGS. 10A, 10B and 10C are time charts showing signal waveforms at several portions of a ring oscillator shown in FIG. 9.
Figure 10B:
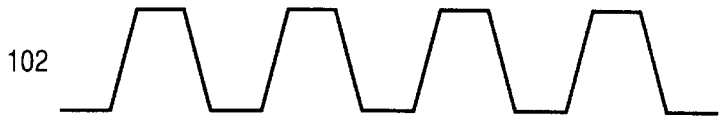
Figure 10C:

The ring oscillator 100 performs an oscillating operation with the odd number of signal inversion circuits 13, 14 and 15 arranged in a ring shape. FIGS. 10A, 10B and 10C show signal waveforms at a node 101 corresponding to the connecting point between the signal inversion circuits 13 and 14, a node 102 corresponding to the connecting point between the signal inversion circuits 14 and 15, and a node 103 corresponding to the connecting point between the signal inversion circuits 15 and 13, respectively. FIGS. 10A, 10B and 10C show ideal signal waveforms including no distortions.

When the node 101 has a low-level potential, the capacitor 12a is charged by electric power supplied via the first diode 11a from the power source terminal 20. Next, when the node 101 has a high-level potential, the node 102 has a low-level potential. Electric charges flows from the capacitor 12a via the diode 11b to the second capacitor 12b.

Subsequently, the node 102 is changed from a low-level potential to a high-level potential. The node 103 has a low-level potential. Thus, electric charges flows from the capacitor 12b via the diode 11c to the third capacitor 12c.

In this manner, by the oscillating operation of the ring oscillator 100, the electric charges can shift from the first capacitor 12a to the second capacitor 12b and subsequently to the third capacitor 12c. With this electric charges shifting, the third capacitor 12c can produce a charged-up voltage.

In this case, output terminals of the signal inversion circuits 13, 14 and 15 are connected to the negative terminals of the first, second and third capacitors 12a, 12b and 12c, respectively. Thus, the output signals of the signal inversion circuits 13, 14 and 15 are equal to and vary together with the electrical potentials of the negative terminals of the first, second and third capacitors 12a, 12b and 12c, respectively. Accordingly, the ring oscillator 100 can perform its oscillating operation in accordance with the charge and discharge operations of the first, second and third capacitors 12a, 12b and 12c. It becomes possible to obtain a stable and desirable charged-up voltage.

Sixth Embodiment

According to the above-described fifth embodiment, when the node 101 is changed from the low-level potential to the high-level potential, the electric charges shift from the first capacitor 12a via the second diode 11b to the second capacitor 12b. Subsequently, before the node 102 has a high-level potential, the node 101 is changed from the high-level potential to the low-level potential.

In this case, the node 104 is capacitor-coupled with the node 101. Thus, the electrical potential of the node 104 is lowered in accordance with a level change of the node 101. Furthermore, the node 104 and the node 105 are coupled each other with the parasitic capacitor appearing at both terminals of the second diode 11b. The electrical potential of the node 105 is lowered in accordance with the level change of the node 101.

Accordingly, part of the electric charges having once shifted from the capacitor 12a to the capacitor 12b will return to the capacitor 12a. The total charge amount transmitted to the next stage is reduced. Similarly, the node 105 and the node 106 are coupled each other with the parasitic capacitor appearing at both terminals of the third diode 11c. Therefore, when the electric charges are conveyed from the capacitor 12b to the capacitor 12c, the total amount of the transmitted electric charges is reduced. Transmitting the reduced amount of electric charges will deteriorate the ability of the charge pump circuit in proportion to an increase of the stage number.

Figure 11:
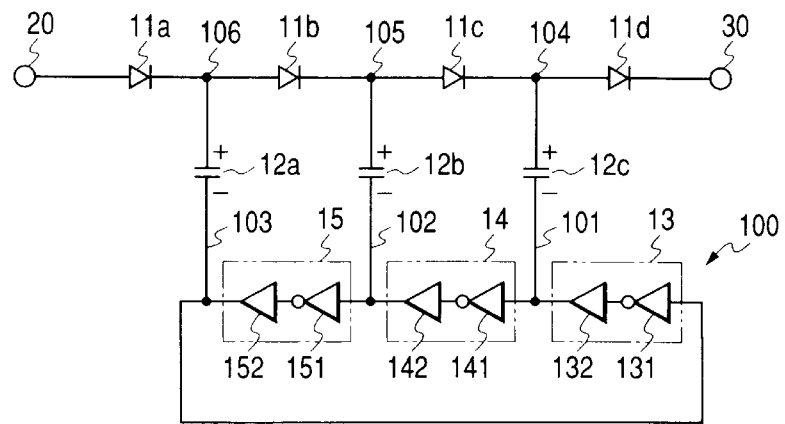
FIG. 11 is a circuit diagram showing an arrangement of a charge pump circuit in accordance with a sixth embodiment of the present invention.

Hence, to eliminate such a disadvantage, this embodiment provides an arrangement shown in FIG. 11. The circuit arrangement of FIG. 11 is different from that of FIG. 9 in that a signal of the ring oscillator 100 is transmitted in an opposite direction. In the drawing, the signal transmitting direction between the power source terminal 20 and the charged-up terminal 30 is reversed while the arrangement of the ring oscillator 100 is not changed compared with FIG. 9.

An operation of the charge pump circuit shown in FIG. 11 will be explained hereinafter.

When the node 103 has a low-level potential, the capacitor 12a is charged by electric power supplied via the first diode 11a from the power source terminal 20. Next, when the node 103 has a high-level potential, electric charges flows from the capacitor 12a via the diode 11b to the second capacitor 12b.

The electrical potential of the node 103 is an electrical potential of the output of the signal inversion circuit 15 which inverts the electrical potential of the node 102. Due to delay during the signal transmission, the node 102 accomplishes a shifting to a high-level potential earlier than the node 103 shifting to a low-level potential, as apparent from the waveforms shown in FIGS. 10A, 10B and 10C.

Accordingly, it becomes possible to accomplish the shifting of electric charges from the capacitor 12b to the capacitor 12c before the electric charges are extracted from the capacitor 12b by the effect of the parasitic capacitor in the second diode 11b. This operation is performed in the next stage, in the same manner. Therefore, it becomes possible to provide a charge pump circuit more efficient than the fifth embodiment.

Next, detailed arrangements of the ring oscillator 100 employed in the above-described fifth and sixth embodiments will be explained.

Figure 12:
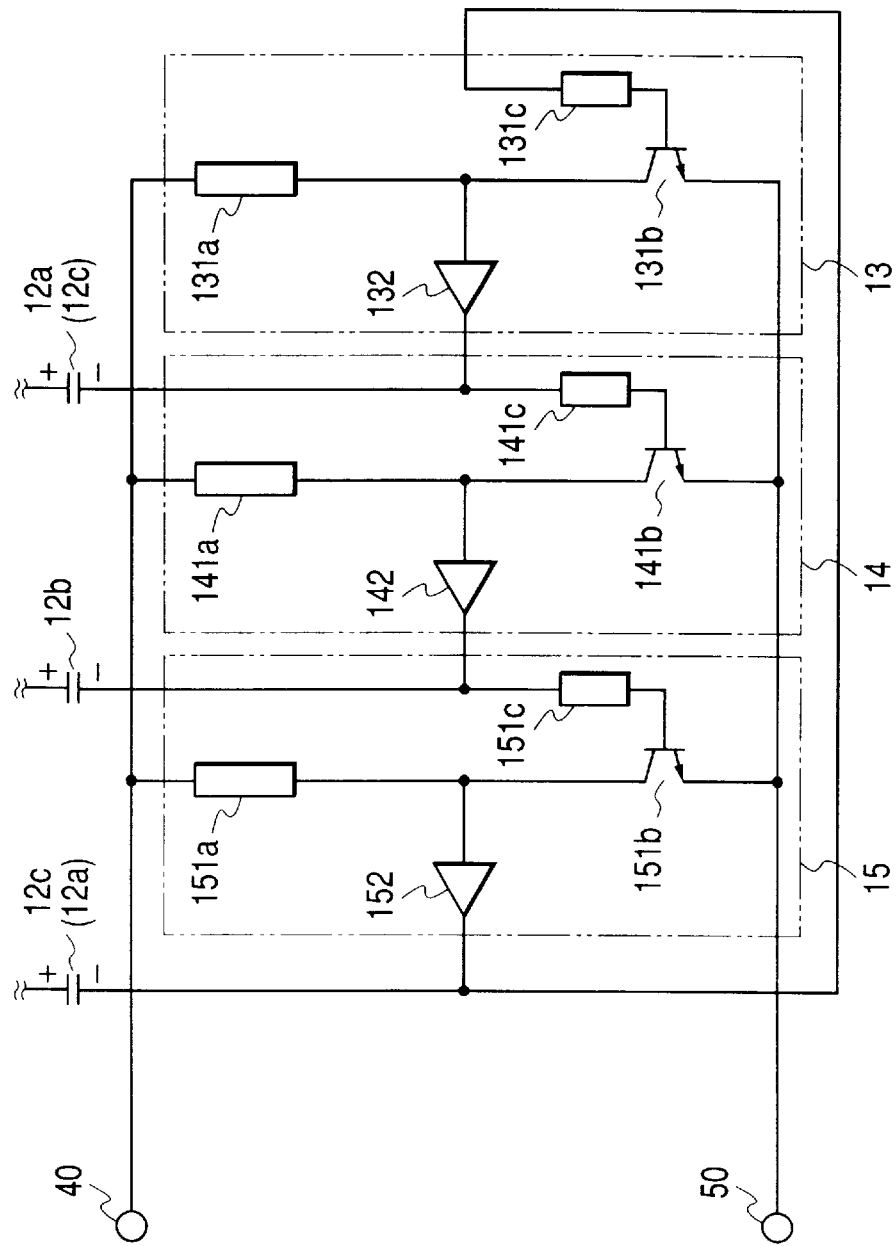
FIG. 12 is a circuit diagram showing a detailed arrangement of a ring oscillator employed in the fifth and sixth embodiments of the present invention.

FIG. 12 shows one example of the detailed arrangement of the ring oscillator 100. The signal inversion circuit 13 comprises an impedance element 131a, such as a constant-current circuit or a resistor, an NPN transistor 131b, an impedance element 131c, such as a resistor, and a buffer 132. The impedance element 131a, the NPN transistor 131b, and the impedance element 131c cooperatively constitute the inverter 131.

Similarly, the signal inversion circuit 14 comprises an impedance element 141a, an NPN transistor 141b, an impedance element 141c and a buffer 142. The signal inversion circuit 15 comprises an impedance element 151a, an NPN transistor 151b, an impedance element 151c and a buffer 152.

With this arrangement, it becomes possible to perform a ring oscillation by alternately turning on and off the NPN transistors 131b, 141b, and 151b.

In the drawing, reference numerals 40 and 50 represent a power source terminal and an earth terminal of the ring oscillator 100, respectively.

Figure 13:
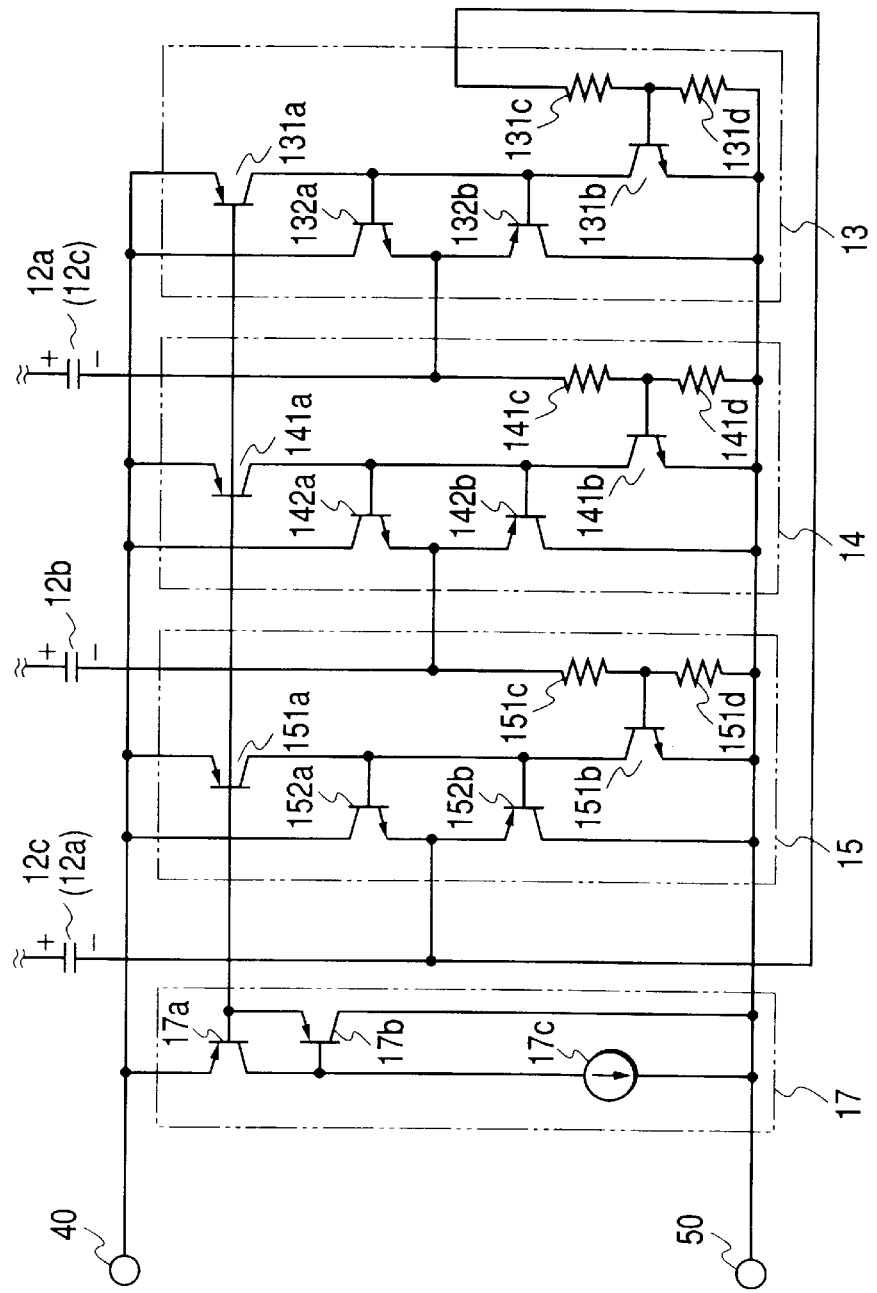
FIG. 13 is a circuit diagram showing a more detailed arrangement of FIG. 12.

FIG. 13 is a more detailed arrangement of the ring oscillator 100. According to the circuit arrangement of FIG. 13, a constant-current circuit 17 is provided. The impedance elements 131a, 141a and 151a are PNP transistors which are associated with a PNP transistor 17a involved in the constant-current circuit 17 to constitute a current-mirror circuit supplying constant current. The constant-current circuit 17 comprises the PNP transistor 17a, a PNP transistor 17b and a constant-current source 17c.

The impedance elements 131c, 141c and 151c are resistors. Another resistors 131d, 141d and 151d are interposed between base and emitter terminals of the NPN transistors 131b, 141b and 151b, respectively. Operating points of the NPN transistors 131b, 141b and 151b can be changed by adjusting the resistance values of these resistors 131c~151c and 131d~151d. Providing the resistors 131d, 141d and 151d is advantageous in that electric charges can be extracted from the bases of the NPN transistors 131b, 141b and 151b in response to each change from ON to OFF of these NPN transistors 131b, 141b and 151b. This increases the switching speed of the NPN transistors 131b, 141b and 151b. Thus, a high-speed operation is feasible.

Furthermore, according to the circuit arrangement shown in FIG. 13, the buffer 132 comprises an NPN transistor 132a and a PNP transistor 132b. Similarly, the buffer 142 comprises an NPN transistor 142a and a PNP transistor 142b. The buffer 152 comprises an NPN transistor 152a and a PNP transistor 152b. In other words, each buffer is constituted by a combination of an NPN transistor and a PNP transistor which cooperatively produce an emitter-follower output signal. Thus, it becomes possible to minimize the delay caused in each buffer. If desirable, one diode or two serial diodes can be interposed between bases of the NPN transistor and the PNP transistor constituting each buffer.

Figure 14:
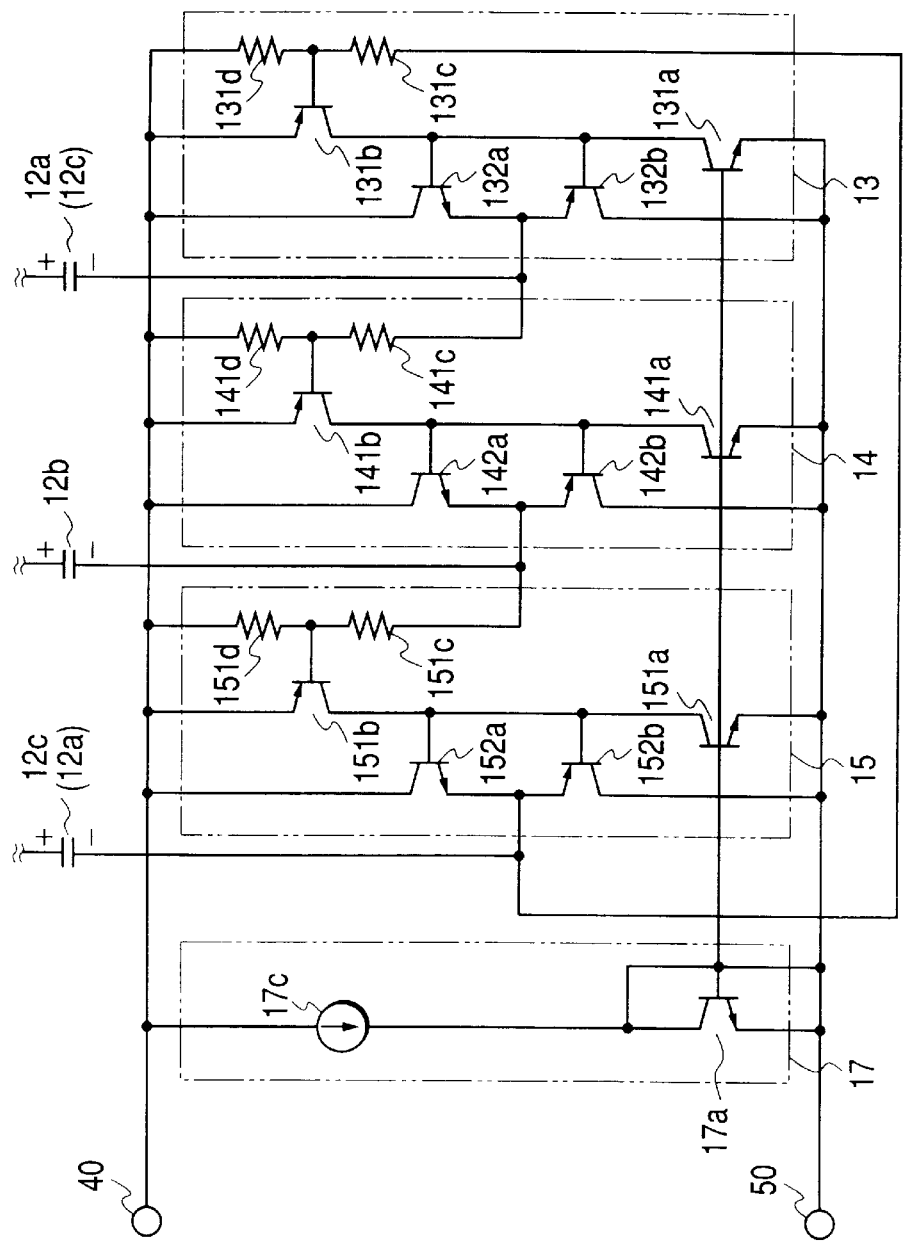
FIG. 14 is a circuit diagram showing another detailed arrangement of the ring oscillator employed in the fifth and sixth embodiments of the present invention.

Furthermore, the circuit arrangement shown in FIG. 13 can be replaced by a circuit arrangement shown in FIG. 14 wherein the PNP transistors 131a, 141a, 151a and the NPN transistors 131b, 141b and 151b are arranged reversely to constitute the inverters.

The conventional charge pump circuit employs MOS elements to assure sufficient ability of the charge pump circuit. However, the circuit arrangements of FIGS. 13 and 14 can use bipolar elements having slower switching speeds to constitute a ring oscillator utilizing their delay times. The ability of the charge pump circuit can be assured sufficiently.

Figure 15:
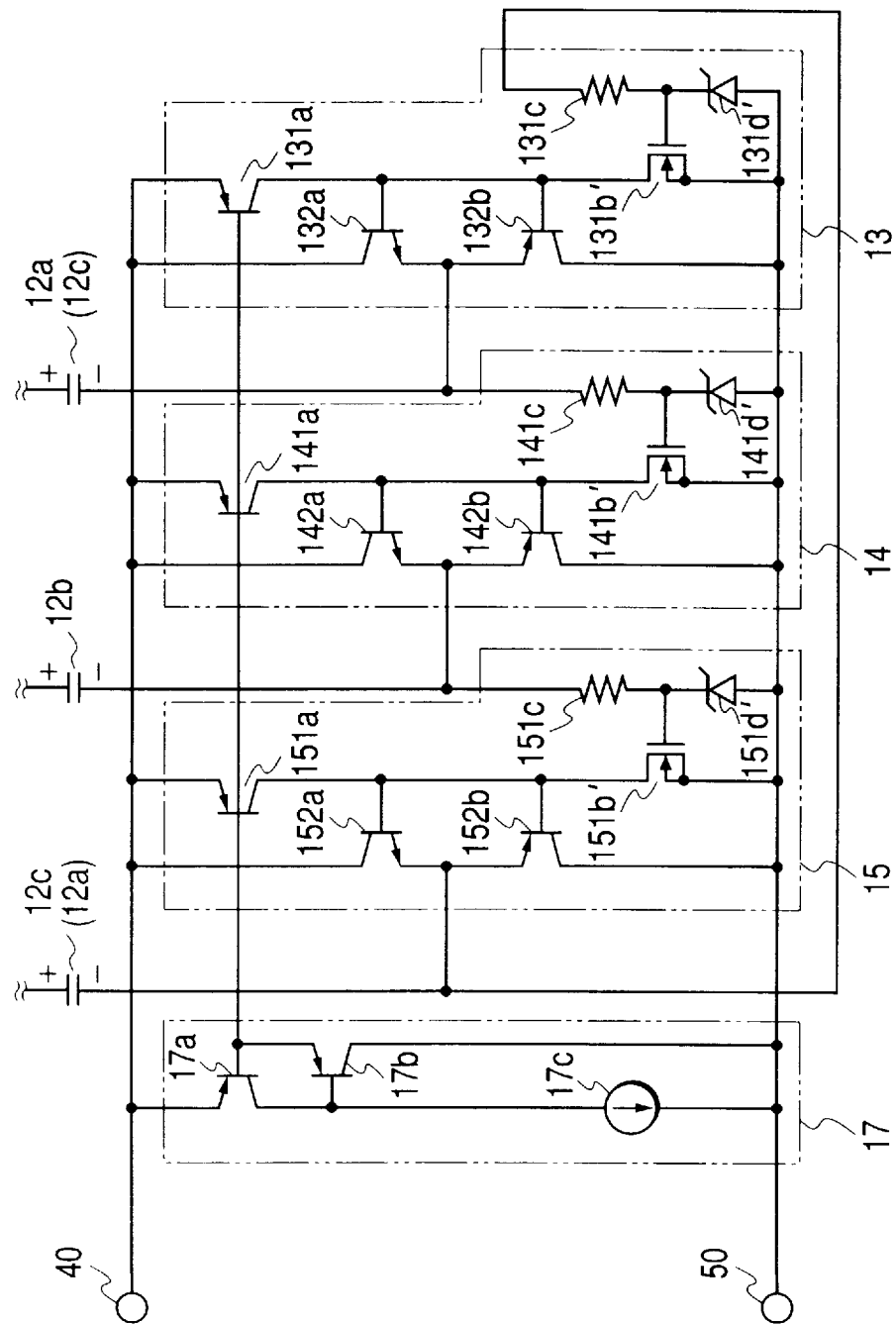
FIG. 15 is a circuit diagram showing still another detailed arrangement of the ring oscillator employed in the fifth and sixth embodiments of the present invention.

Furthermore, it is possible to arrange the ring oscillator by using MOS elements. FIG. 15 shows another example of the ring oscillator 100 comprising N-channel MOS transistors 131b', 141b' and 151b'. According to the circuit arrangement shown in FIG. 15, Zener diodes 131d', 141d' and 151d' are provided to protect the gates of the MOS transistors. Using such MOS transistors 131b', 141b' and 151b' is effective to increase the switching speed. The oscillation frequency can be increased. The ability of the charge pump circuit can be enhanced.

Seventh Embodiment

Figure 16:
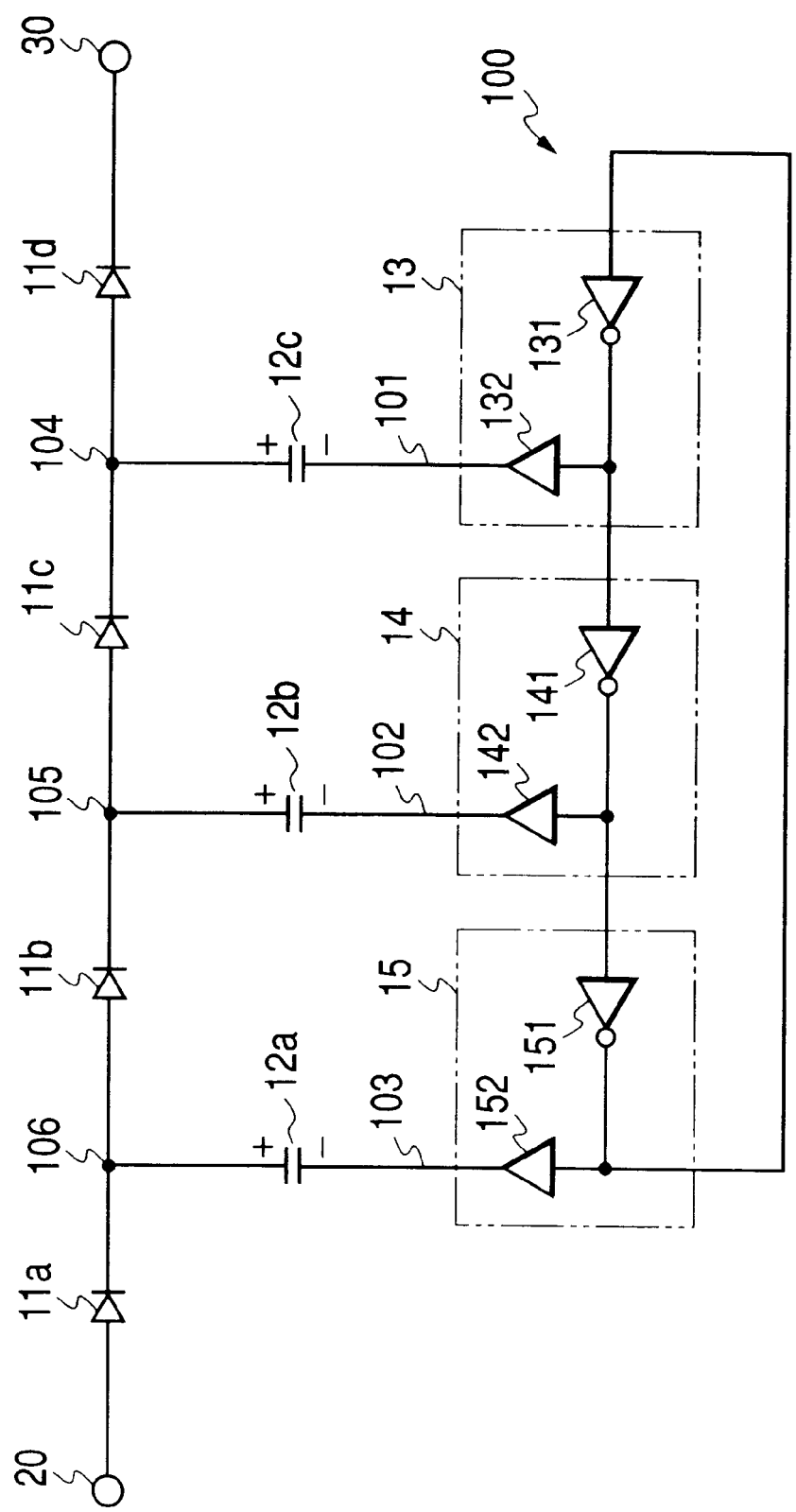
FIG. 16 is a circuit diagram showing an arrangement of a charge pump circuit in accordance with a seventh embodiment of the present invention.

In the fifth and sixth embodiments, the inverters 131, 141 and 151 and the buffers 132, 142 and 152 are connected in series. FIG. 16 shows a modified circuit arrangement wherein the buffers 132, 142 and 152 are interposed between respective output terminals of the ring oscillator 100 and the negative terminals of the capacitors 12c, 12b and 12a. The circuit arrangement of FIG. 16 corresponds to that of the above-described sixth embodiment. It is possible to modify the circuit arrangement of FIG. 16 so as to correspond to the above-described fifth embodiment.

Figure 17:
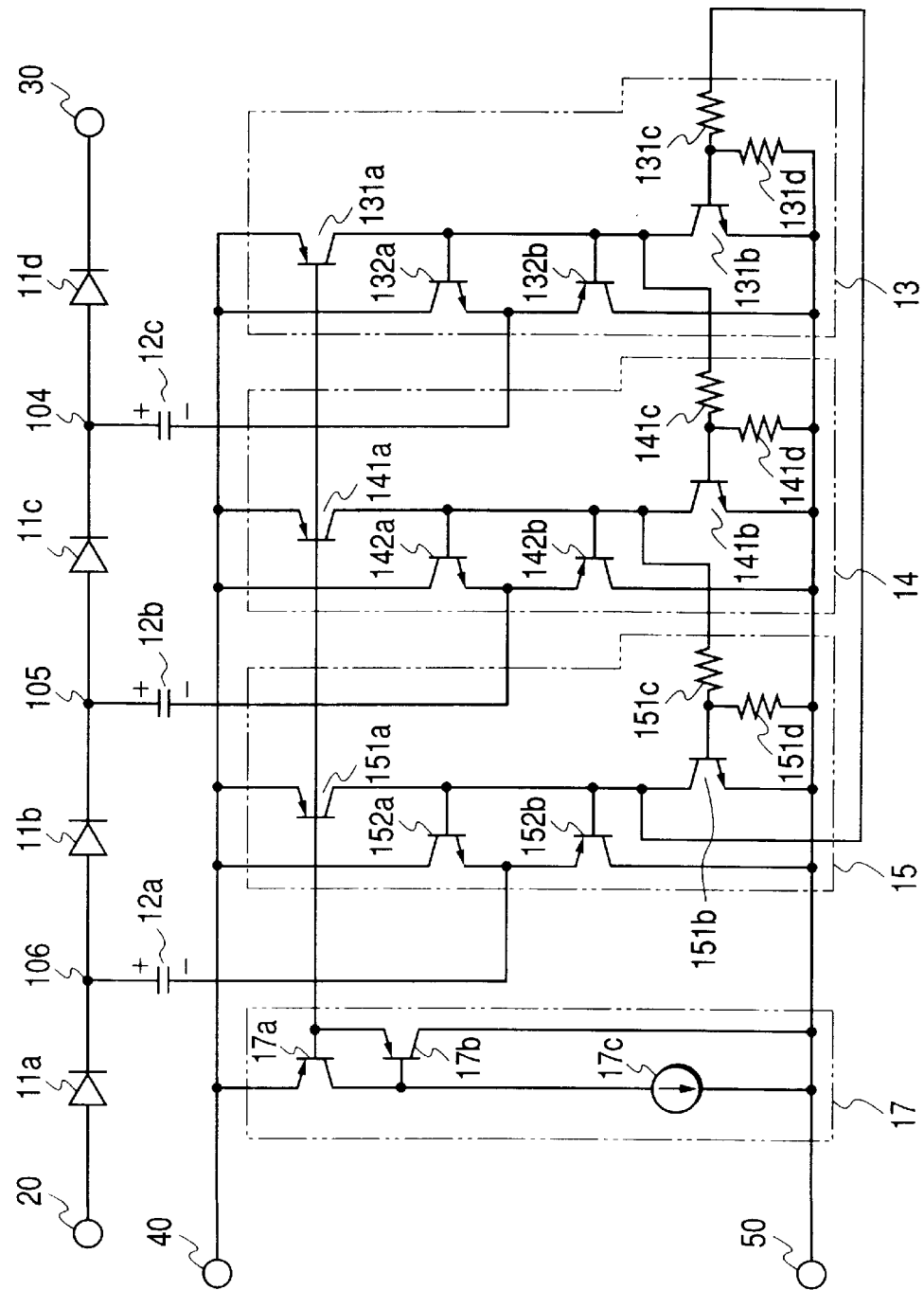
FIG. 17 is a circuit diagram showing a more detailed arrangement of FIG. 16.

FIG. 17 shows a detailed circuit arrangement of FIG. 16. In FIG. 17, NPN transistors 131b, 141b and 151b supply their collector voltages to bases of next-stage transistors to cause a ring oscillation. The circuit arrangement of FIG. 17 corresponds to that shown in FIG. 13, however can be modified so as to correspond to FIG. 14 or 15.

Various Modifications

Figure 18:
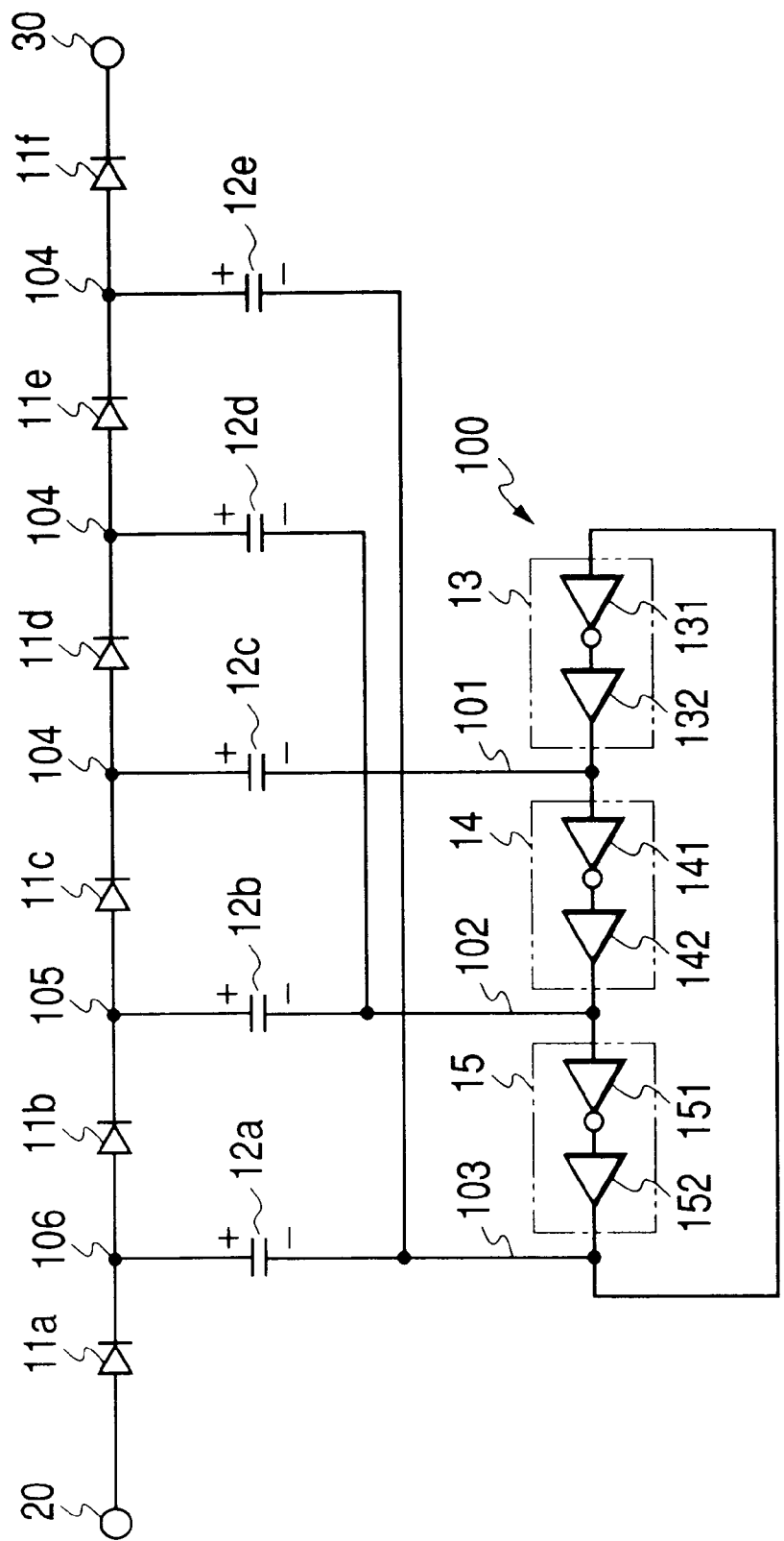
FIG. 18 is a circuit diagram showing an arrangement of a charge pump circuit in accordance with another embodiment of the present invention.

In the above-described ftfth to seventh embodiments, the charge pump circuit has three stages. However, the stage number is not limited to three and can be changed to an appropriate value equal to or larger than four. Furthermore, the number of the signal inversion circuits can be determined independent of the stage number of the charge pump circuit. FIG. 18 shows a circuit arrangement which uses five stages for charging up a given voltage. FIG. 18 is identical with FIG. 11 in the arrangement of the ring oscillator 100, but is different in that additional diodes 11e, 11f and capacitors 12d, 12e are provided as shown in the drawing.

Moreover, the diodes 11a to 11d serving as the rectifying means can be replaced by any other elements having appropriate rectifying function, such as bipolar transistors and MOS transistors.

Furthermore, the buffers 132, 142 and 152 constituting the ring oscillator 100 can be omitted when the inverters 131, 141 and 151 have sufficient output capacities.

Yet further, it is possible to ground the output terminal 30 so that a negative voltage is produced from the power source terminal 20.

If required, the oscillation of the ring oscillator 100 can be stopped by forcibly lowering the base potential of the NPN transistor 131b of the inverter 131 via another NPN transistor so that the NPN transistor 131b is forcibly turned off.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A charge pump circuit comprising:

a plurality of capacitors arranged to charge and discharge for generating a charged-up voltage;

oscillating means for generating a clock signal to be applied to said plurality of capacitors to alternately charge and discharge said plurality of capacitors; and monitoring means for detecting electrical potentials on at least two of said plurality of capacitors and controlling the clock signal of said oscillating means based on the electrical potentials on said at least two of said plurality of capacitors.

2. A charge pump circuit comprising:

a first capacitor;

a second capacitor;

first rectifying means connected to one terminal of said first capacitor for charging said first capacitor;

second rectifying means connected between said one terminal of said first capacitor and one terminal of said second capacitor for charging said second capacitor, wherein charging of said first capacitor via said one terminal of said first capacitor and charging of said second capacitor via said one terminal of said second capacitor are alternatively performed to generate a charged-up voltage from said one terminal of said second capacitor;

first comparing means for comparing a voltage of the other terminal of said first capacitor with a first reference voltage;

second comparing means for comparing a voltage of the other terminal of said second capacitor with a second reference voltage; and charge/discharge control means for alternatively charging and discharging said first and second capacitors via said other terminals of said first and second capacitors based on comparison results from said first comparing means and said second comparing means.

3. The charge pump circuit in accordance with claim 2, wherein said charge/discharge control means comprises:

flip-flop circuit means for performing a set or reset function based on a comparison result of said first comparing means and performing the other of the set or reset function based on a comparison result of said second comparing means;

first switching means responsive to an output of said flip-flop circuit means for performing the charge and discharge of said first capacitor via said other terminal of said first capacitor; and second switching means responsive to the output of said flip-flop circuit means for performing the charge and discharge of said second capacitor via said other terminal of said second capacitor.

4. The charge pump circuit in accordance with claim 2, wherein said charge/discharge control means comprises:

first constant-current charging means connected to said other terminal of said first capacitor for supplying constant current to charge said first capacitor; and second constant-current charging means connected to said other terminal of said second capacitor for supplying constant current to charge said second capacitor.

5. The charge pump circuit in accordance with claim 4, wherein each of said first constant-current charging means and said second constant-current charging means comprises a current-mirror circuit which is connected to a power source and supplies said constant current.

6. The charge pump circuit in accordance with claim 5, further comprising means for forming a closed path which allows said constant current to flow from said current-mirror circuit without flowing to said first and second capacitors after the constant-current charge operation is performed by the constant current supplied from said current-mirror circuit.

7. The charge pump circuit in accordance with claim 2, wherein said charge/discharge control means comprises:

first resistance means connected in series with said other terminal of said first capacitor for shaping a discharge voltage waveform into a trapezoidal shape; and second resistance means connected in series with said other terminal of said second capacitor for shaping a discharge voltage waveform into a trapezoidal shape.

8. The charge pump circuit in accordance with claim 2, wherein said charge/discharge control means comprises:

first constant-current discharging means connected to said other terminal of said first capacitor for discharging constant current from said first capacitor; and second constant-current discharging means connected to said other terminal of said second capacitor for discharging constant current from said second capacitor.

9. A charge pump circuit comprising:

a first capacitor;

a second capacitor;

first rectifying means connected to one terminal of said first capacitor for charging said first capacitor;

second rectifying means connected between said one terminal of said first capacitor and one terminal of said second capacitor for charging said second capacitor, wherein charging of said first capacitor via said one terminal of said first capacitor and charging of said second capacitor via said one terminal of said second capacitor are alternately performed to generate a charged-up voltage from said one terminal of said second capacitor; and self-oscillating means for monitoring a voltage of other terminal of said first capacitor and a voltage of other terminal of said second capacitor and performing a self oscillation so as to alternately execute charging and discharging of said other terminals of said first and second capacitors.

10. The charge pump circuit in accordance with claim 9, further comprising means for stopping said self oscillation.

11. The charge pump circuit in accordance with claim 1, further comprising a plurality of constant-current charging means, each of said constant-current charging means being connected to a capacitor for supplying constant current to charge it.

12. The charge pump circuit in accordance with claim 11, wherein each constant-current charging means comprises a current-mirror circuit which is connected to a power source and supplies said constant current.

13. The charge pump circuit in accordance with claim 12, further comprising means for forming a closed path which allows said constant current to flow from said current-mirror circuit without flowing to said capacitors after the constant-current charge operation is performed by the constant current supplied from said current-mirror circuit.

14. The charge pump circuit in accordance with claim 1, further comprising a plurality of constant-current discharging means, each of said constant-current discharging means being connected to a capacitor for discharging constant current from it.

15. A charge pump circuit comprising:

a first capacitor;

a second capacitor, the first and second capacitors arranged to charge and discharge;

a voltage charged-up circuit for generating an output signal to be applied to said first and second capacitors to alternately charge said first and second capacitors via one terminal of said first and second capacitors for generating a charged-up voltage from said one terminal of said second capacitor; and a self-oscillating circuit for monitoring a voltage of other terminal of said first capacitor and a voltage of other terminal of said second capacitor and performing a self oscillation so as to alternately execute charging and discharging of said other terminals of said first and second capacitors.

16. The charge pump circuit in accordance with claim 15, further comprising a circuit for stopping said self oscillation.

* * * * *